US005354958A

United States Patent [19]

Bitko

[11] Patent Number: 5,354,958

[45] Date of Patent: Oct. 11, 1994

[54] JITTER SWITCH

[75] Inventor: Sheldon S. Bitko, East Brunswick, N.J.

[73] Assignee: Fifth Dimension Inc., Trenton, N.J.

[21] Appl. No.: 25,745

[22] Filed: Mar. 3, 1993

[51] Int. Cl.$^5$ .......... H01M 35/14

[52] U.S. Cl. .......... 200/61.45 R; 200/61.52

[58] Field of Search .......... 200/61.45 R, 61.53, 200/61.45 M

[56] References Cited

U.S. PATENT DOCUMENTS

| | | | |
|---|---|---|---|
| 2,758,195 | 8/1976 | Ludwig | 200/61.52 X |
| 2,806,914 | 9/1957 | Tedder | 200/61.45 R |
| 2,892,049 | 6/1959 | Rubinstein | 200/61.45 R |
| 2,984,820 | 5/1961 | Kennell | 200/61.51 X |
| 2,996,586 | 8/1961 | Shindledecker et al. | 200/61.49 |
| 3,673,362 | 6/1972 | Carlson, Jr. et al. | 200/61.45 R |
| 3,778,572 | 12/1973 | Matsui et al. | 200/61.45 M |
| 3,935,669 | 2/1976 | Potrzuski et al. | 200/61.45 R X |
| 4,043,076 | 8/1977 | Potrzuski et al. | 200/61.52 |
| 4,185,180 | 1/1980 | Anderson | 200/61.45 R |
| 4,425,488 | 1/1984 | Moskin et al. | 200/61.52 X |
| 4,513,183 | 4/1985 | Hill | 200/61.45 R |
| 4,683,355 | 7/1987 | Bitko | 200/61.47 |
| 4,686,335 | 8/1987 | Grant | 200/61.45 R |
| 4,766,275 | 8/1988 | Hemmann et al. | 200/61.52 X |

*Primary Examiner*—J. R. Scott

*Attorney, Agent, or Firm*—Burns, Doane, Swecker & Mathis

[57] ABSTRACT

A jitter switch comprises a casing defining therein a chamber in which an armature is freely movable in longitudinal and transverse directions. Positive and negative terminals communicate with the chamber. The armature is freely movable longitudinally to make contact with either of the positive and negative terminals. In every longitudinal position of the armature, the armature and terminals define transversely opposite conductors. The armature is freely movable in the transverse direction to bring the transversely opposite conductors into engagement.

15 Claims, 2 Drawing Sheets

JITTER SWITCH

BACKGROUND OF THE INVENTION

The present invention relates to a jitter switch which senses when a person or object is subjected to a change in velocity and thus changes the state of the switch, i.e., opens or closes the switch.

Such jitter switches have numerous useful applications. For example, they can be carried by persons or objects whose location is to be monitored. By providing a signal indicative of the carrier being in motion, the location of the carrier can be monitored by the use of detection equipment which receives the signal.

It is, however, highly desirable that the switches be omni-directional, i.e., that they be operable regardless of the orientation of the carrier, and that the switches be sensitive to even slight amounts of motion.

Sensors have been proposed which involve the use of a liquid body of electrically conductive material, such as mercury, which is movable to make or break contact between two electrodes when a carrier is subjected to an acceleration or deceleration. However, for environmental reasons, the use of mercury might not always be desirable, and the sensitivity of the switch may be less than desired. Therefore, it would be desirable to provide a non-mercury type of jitter switch which is highly sensitive and omni-directional.

SUMMARY OF THE INVENTION

The present invention relates to a jitter switch comprising a casing which forms an internal chamber defining longitudinal and transverse directions. An electrically conductive armature is disposed in the chamber. Positive and negative electrical terminals communicate with the chamber. The armature, together with the positive and negative electrical terminals, define first and second contact regions in the chamber. Each of the contact regions comprises longitudinally opposite conductors, and transversely opposite conductors. The longitudinally opposite conductors are defined by the armature and a respective one of the positive and negative terminals. The transversely opposite conductors are defined by the armature and a respective one of the positive and negative terminals. The armature is freely movable in the longitudinal direction for producing engagement between the longitudinally opposite conductors of either of the first and second contact regions. The transversely opposite conductors of each contact region remain in transversely opposite relationship in all longitudinal positions of the armature. The armature is freely movable in the transverse direction for producing engagement between the transversely opposite conductors of either or both of the contact regions.

At least one of the contact regions preferably includes a recess formed in the armature, with a respective one of the positive and negative terminals projecting into the recess. Preferably, each of the contact regions comprises such a relationship.

Preferably, at least one of the contact regions includes a recess formed in a respective terminal with an end of the armature projecting into the recess. Each of the contact regions could be so configured.

Preferably, one of the contact regions comprises a recess formed in one of the armature and terminals, with the other of the armature and respective terminal projecting into the recess. The other contact region comprises a wall of the chamber and a protuberance carried by the armature.

The longitudinally opposite conductors, and the transversely opposite conductors, are preferably shaped to make point contact with one another.

The chamber may be filled with a dampening fluid to dampen the movement of the armature.

BRIEF DESCRIPTION OF THE DRAWING

The objects and advantages of the invention will become apparent from the following detailed description of preferred embodiments thereof in connection with the accompanying drawings in which like numerals designate like elements and in which.

DETAILED DESCRIPTION OF THE PREFERRED EMBODIMENTS OF THE INVENTION

Figure 1:
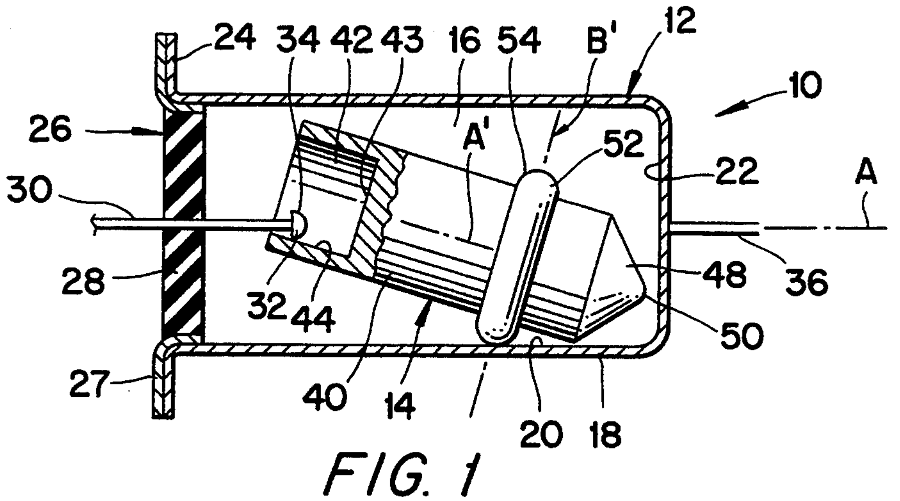
FIG. 1 is a longitudinal sectional view taken through a switch according to a first embodiment of the invention, with the longitudinal axis of the switch oriented horizontally.

A jitter switch 10 comprises a casing 12 and a conductor member or armature 14 displaceably mounted within a chamber 16 formed by the casing. The casing 18, which is symmetrically configured about its longitudinal axis A, includes a container or can 18 formed of an electrically conductive material such as metal. The chamber 16 includes a circular cylindrical side wall 20 and a circular end wall 22 located at a longitudinal end of the side wall.

At its opposite end, the side wall includes a radially outwardly bent, annular flange 24. The flange 24, side wall 20, and end wall 22 are of one piece construction.

Mounted to the flange 24 is a separate end wall 26 comprised of (i) an annular ring 27 formed of a material capable of being welded to the can 18, and (ii) an electrically insulative material 28, such as a glass or elastomer adhered to the center of the ring 27. The ring 27 is welded to the flange 24 to seal the chamber 16.

A stiff electrically conductive post 30 extends through the insulation 28 and terminates inside the chamber 16 to present a protrusion 32 having a semi-spherical surface 34 facing toward the opposing end wall 22. That protrusion 32 constitutes a first electrical terminal. An electric wire 36 is connected to the can 18, whereby the can constitutes a second electrical terminal of opposite polarity to the terminal 32. It will be understood that the end wall 22 constitutes an end terminal portion of the second terminal, and the side wall 20 constitutes a side terminal portion of the second terminal.

The chamber 16 could be sealed, i.e., air tight, or unsealed if all of the electrical contacts are plated with a noble material such as gold.

Figure 2:
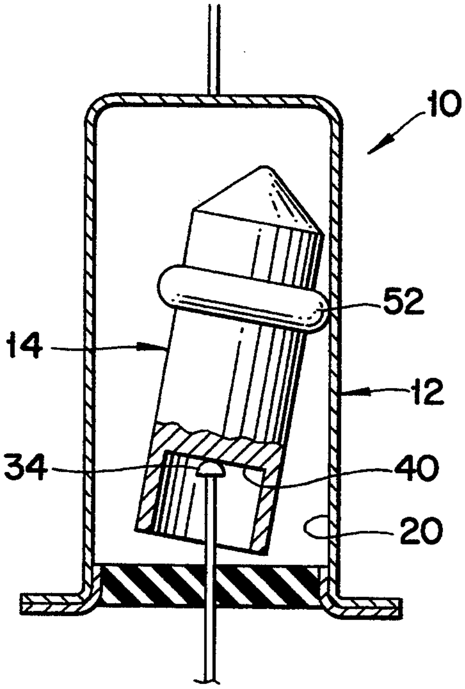
FIG. 2 is a view similar to FIG. 1, with the longitudinal axis oriented vertically.
Figure 3:
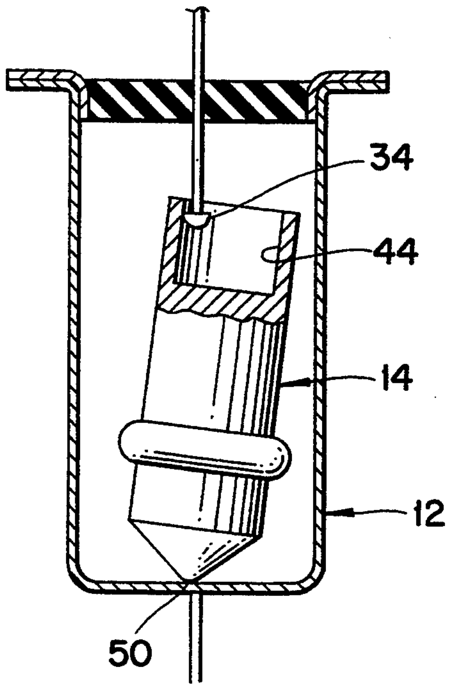
FIG. 3 is a view similar to FIG. 2, with the switch inverted by a 180° from the position shown in FIG. 2.

The post 30 and wire 36 can be connected to a suitable electric circuit (not shown). The armature 14, as will be explained, is able to open and close the circuit, regardless of the orientation of the switch casing relative to horizontal and vertical. Three such orientations are depicted in FIGS. 1-3, respectively, namely, wherein (i) the longitudinal axis A of the casing 12 is horizontal (FIG. 1), (ii) the axis A is vertical, with the end wall 28 disposed at the bottom (FIG. 2), and (iii) the axis A is vertical, with the end wall 22 being at the bottom (FIG. 3).

The armature 14 comprises a non-liquid, i.e., solid, generally cylindrical body 40, preferably formed of an electrically conductive metallic material, arranged for free longitudinal, transverse, rotational, and pivotal movements in the can 18. At its longitudinal end section facing the first terminal 32, the body 40 possesses a cylindrical recess 42 having an inner end surface 43 and a cylindrical side surface 44. The surfaces 42, 44, together with the terminal 30, form a first conductive region of the switch.

The opposite end of the body 40 tapers generally frusto-conically to form a nose 48. That nose preferably terminates in a tip surface 50 shaped as a spherical segment. The nose 48, together with the wall 22, 20 of the chamber 16, form a second conductive region of the conductor member 14. A side conductor portion of the armature is formed by an annular protuberance 52 extending circumferentially around the body 40. The protuberance 52, formed of an electrically conductive material, could be bonded to the body 40, or the body 40 could be suitably machined from a single piece of material to integrally form the recess 42 nose 48, and protuberance 52.

The conductors 34, 52 are shown as being rounded, e.g., semi-spherical. Those conductors could, however, be pointed in order to increase the sensitivity of the switch. A problem with a pointed configuration is that the point will tend to wear to a semi-spherical configuration with repeated use, whereby the switch sensitivity gradually changes. By making the conductors semi-cylindrical to start with, the switch sensitivity remains uniform.

Instead of being formed entirely of conductive material, the body 40 could be formed of an insulative material, such as plastic, having interconnected conductive strips mounted thereon at the surfaces 42, 43, 50, 52. The protuberance 52 has a smoothly convex outer surface 54. It will be appreciated that an electric circuit is completed from the post 30 to the wire 36 when (a) the tip 50 (and/or the protuberance 52) contacts the wall 20, 22 of the chamber 16, and (b) the terminal 32 contacts either of the surfaces 43, 44 of the recess 42.

It will be appreciated that it is difficult to provide an armature which is perfectly balanced about its longitudinal and transverse axes A′ and B′, due to normal manufacturing tolerances. However, it is unnecessary to provide such a balanced armature, since the armature performs suitably when in an unbalanced condition. FIG. 1 shows the armature which is unbalanced relative to its transverse axis B′. By moving the protuberance 52 farther to the left, the armature will approach a more balanced condition, if desired.

Whenever the switch 10 is oriented such that its longitudinal axis A is horizontal, the protuberance 52 will gravitate transversely with respect to axis A and contact the side wall 20 as depicted in FIG. 1. If the body 40 were perfectly balanced about the protuberance, then the first terminal 32 would be spaced from the surfaces 43, 44 of the recess 42, so that the electric circuit remains open. Upon being subjected to a vibration tending to unbalance the forces acting on the conductor member 14, the body 40 may pivot about a fulcrum defined by the point of contact between the protuberance 52 and the side terminal portion 20. If the vibration is strong enough, the pivoting can result in contact occurring between the first terminal 32 and the first conducting region 44 in order to close the circuit, as depicted in FIG. 1.

If the switch axis A is oriented vertically, with the end wall 26 disposed at the bottom (see FIG. 2), then the conductor member 14 will gravitate downwardly such that the inner surface 43 of the recess 42 comes to rest upon the first terminal 32. The point of contact between the surface 43 and the terminal 32 forms a fulcrum about which the conductor member 14 may pivot.

The armature, e.g., the diameter of recess 42, should be configured to ensure that when the armature leans as shown in FIG. 3, the protuberance will not engage the side wall of the can, in order to ensure that contact occurs between the conductors 34, 44.

If the switch axis A is oriented vertically, with the end wall 22 disposed at the bottom (see FIG. 3), the conductor member 14 will gravitate downwardly until the tip 50 comes to rest against the end terminal portion 22. If the conductor member 14 is perfectly balanced about its axis A′, then the first terminal 32 will be out of contact with the side surface 44 of the recess 43, and the circuit will be open. If the switch is subjected to a sufficiently strong vibration, the conductor member can pivot about a fulcrum defined by the point of contact between the tip 50 and the end terminal portion, whereupon the side conductor section 44 would contact the first terminal 32 and close the circuit as shown in FIG. 3.

It will be appreciated that the switch can be oriented in positions other than those shown in FIGS. 1-3, whereupon the conductor member 14 will assume an appropriate orientation.

The sensitivity of the switch can be determined in a number of ways by changing the inertia of the conductor member 14. For example, a lighter (lower weight) conductor member 14 would be more sensitive to vibration than a heavier conductor member. Also, by filling the chamber 16 with a dampening liquid, such as oil, the movement of the conductor member will be dampened, and will thus be less sensitive to vibration.

Figure 4:
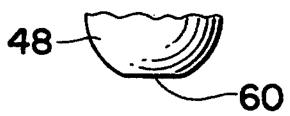
FIG. 4 is a fragmentary view of a protuberance carried by the armature, with the outer tip of the protuberance being flat.
Figure 5:
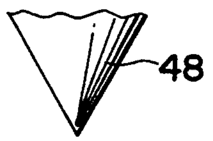
FIG. 5 is a fragmentary view of another protuberance shape which is less blunt than the shape shown in FIG. 4.

The sensitivity of the switch also depends upon the type of contact between the electrical conductors. The contact between all of the electrical conductor in the FIGS. 1-3 embodiment is point contact, thereby making the switch highly sensitive. The first terminal 32, recess 42, nose 48, and protuberance 52 may take difference shapes than those shown. By flattening the curvature of those surfaces, the behavior of the conductor member will be altered. For example, in FIG. 4, the protuberance 52A has a flat 60, thereby resulting in a greater area of contact with the side wall 20 to make the conductor member more stable (i.e., less sensitive) when the switch axis A is horizontal. Hence, a more intensive vibration is required to close the circuit. Alternatively, the protuberance could be sharp as shown in FIG. 5 to increase the sensitivity. Similar variations in shape could be made to the nose 50 and the protrusion 32.

The sensor switch of the present invention is intended to assume a very small size. For example, the outer diameter of the cylindrical wall 20 of the case could be about one quarter inch or less, e.g., one eighth inch, and the length of the casing could be about one-half inch or less, e.g. one quarter inch.

As pointed out earlier, the recess 42 and the post 30 form a first contact region. A second contact region is formed by the wall of the chamber 16 on the one hand, and the protuberance 52 and nose 50 on the other hand. The inner end surface 43 of the recess 42, together with a portion of the semi-spherical surface 34 form longitudinally opposite conductors of the first contact region. The circular cylindrical recess 44, together with another portion of the semi-spherical surface 34 form transversely opposite conductors of the first contact region.

The nose 50 of the armature together with the end wall 22 of the chamber 16 form longitudinally opposite conductors of the second contact region. The protuberance 52 and the cylindrical side wall 20 of the chamber 16 together form transversely opposite conductors of the second contact region.

It will be appreciated that the armature is freely longitudinally shiftable to cause the longitudinally opposite conductors of either, neither, or both of the contact regions to become engaged. Also, the armature 14 is freely transversely movable to cause the transversely opposite conductors of either, neither or both of the first and second contact regions to become engaged. Regardless of the longitudinal position of the armature 14, the transversely opposite conductors of each contact region remain in transversely opposite relationship.

A switch according to the present invention can be used in numerous ways to sense a change in velocity o occurring as the result of the application or acceleration or deceleration to the switch carrier, e.g., as can be caused by shock or vibration. For example, the switch is suited to act as a motion sensor for providing a signal whenever the carrier is in motion, thereby enabling the location of the carrier to be monitored. When the carrier is in motion, with a varying (unstable) velocity, a vibration of the conductor member 14 will result in the conductor member 14 repeatedly opening and closing the circuit to produce a distinctive wave pattern or electrical footprint which is a function of the type of vibration which is occurring. For example, an accidental jarring of the switch will produce one type of electric footprint; vibration occurring as a result of the carrier being in motion will produce a different type of electric footprint. By feeding the electric signal to an analyzer, the nature and cause of the vibration can be deduced.

Figure 6:
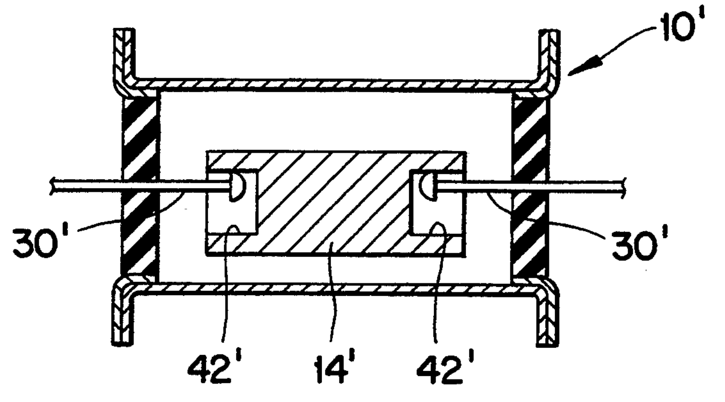
FIG. 6 is a longitudinal sectional view taken through a second preferred embodiment of the invention.
Figure 7:
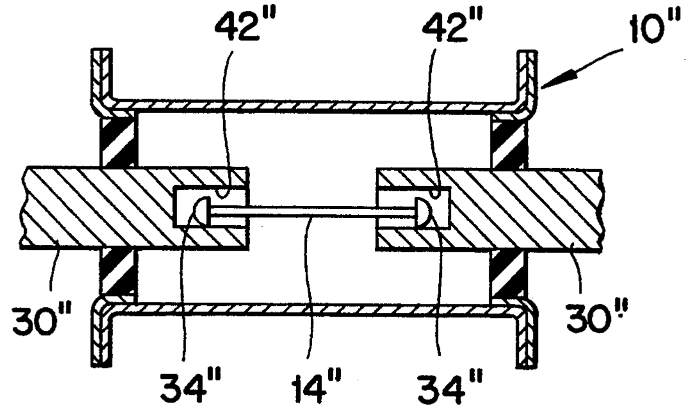
FIG. 7 is a view similar to FIG. 6 of yet another embodiment of the invention.
Figure 8:
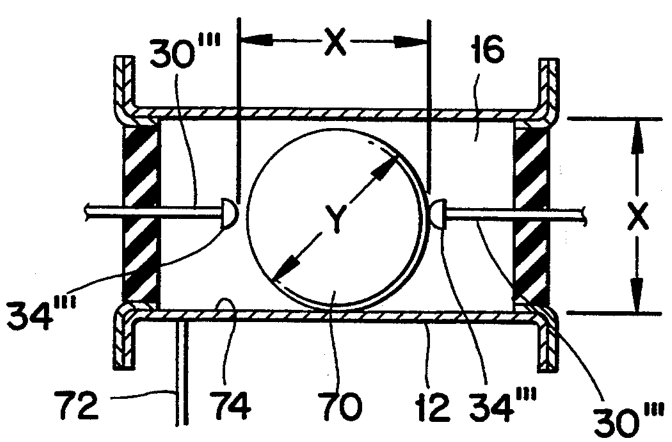
FIG. 8 is a view similar to FIG. 6 of a further embodiment of the invention.

Alternative embodiments of the invention are depicted in FIGS. 6, 7 and 8, respectively. In the sensor switch 10′ shown in FIG. 6, each of the positive and negative contact regions is defined by (i) a circular cylindrical recess 42′ in the armature 14′ and (ii) a post type terminal 30′. The terminals 30′ are of different polarities.

In the switch 10″ shown in FIG. 7, each of the contact regions is defined by (i) a circular cylindrical recess 42″ formed in an end of a terminal 30″, and (ii) one end of a rod-shaped armature 14″. The armature 14″ has semi-spherical surfaces 34″ at each of its longitudinal ends. The terminals 30″ are of different polarities.

It will be appreciated that each of the switches disclosed in FIGS. 6 and 7 includes longitudinally opposite conductors and transversely opposite conductors at each contact region. The armature is freely longitudinally and transversely shiftable to interengage those opposite conductors. In all longitudinal positions of the armature, the transversely opposite conductors remain in a transversely opposite relationship.

In FIG. 8, a switch is shown wherein the longitudinally spaced conductors 34‴ are of the same polarity, and they are spaced apart by a distance X which is equal to the inner diameter of the chamber 16. Situated between the conductors 34‴ is an electrically conductive sphere 70 having a diameter Y which is slightly less than X. The casing 12 is connected to a terminal 72 so as to be of a different polarity than the conductors 34‴. The cylindrical inside wall 74 of the casing 12, together with the sphere, defines transversely spaced conductors. Each contact region thus comprises one of the conductors 34‴ and the inside wall of the cam.

It would also be possible to connect the conductors 34‴ to different resistors so that it is possible to determine which of those conductors has been contacted by the sphere 70 and thus determine in which direction the carrier has tilted.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A jitter switch, comprising:

a casing including a cylindrical wall defining a first longitudinal axis and forming a cylindrical chamber, said cylindrical wall formed of an electrically conductive material;

first and second electrodes mounted at opposite longitudinal ends of said chamber in fixed longitudinally spaced relationship to one another, said first and second electrodes being of opposite polarity, and one of said first and second electrodes being electrically connected to said cylindrical wall; and an electrically conductive armature disposed within said chamber and comprising a body, said body defining a second longitudinal axis and first and second longitudinally spaced ends, said body being symmetrical about said second longitudinal axis, said armature having an outer periphery and a protuberance extending circumferentially around said outer periphery at a location between said first and second armature ends for engaging said cylindrical wall and defining a fulcrum about which said armature pivots, said armature being movable parallel to said first axis to bring said first and second armature ends into engagement with said first and second electrodes, respectively, and being movable laterally of said first axis to enable said protuberance to contact different portions of said cylindrical wall.

2. A jitter switch according to claim 1, wherein said first electrode comprises an end wall defining said first end of said chamber, said second electrode comprising a post extending into said chamber along said first axis and terminating in a convexly curved surface, a center portion of said first end of said armature projecting toward said first end wall, and said second end of said armature forming a recess into which said second electrode extends.

3. A jitter switch according to claim 2, wherein said center portion of said first end of said armature makes point contact with said end wall, and said convexly curved surface makes substantially point contact with a surface defining said recess.

4. A jitter switch according to claim 2, wherein said recess includes a cylindrical side surface coaxial with said second axis, and an inner end surface closing an inner end of said recess.

5. A jitter switch according to claim 1, wherein said chamber is sealed air tight.

6. A jitter switch according to claim 1, wherein said chamber is filled with dampening liquid.

7. A jitter switch according to claim 1, wherein an outer face of said protuberance is convexly curved.

8. A jitter switch according to claim 1, wherein said outer periphery of said body is of cylindrical cross-sectional shape.

9. A jitter switch, comprising:

a casing forming an inner chamber defining a first longitudinal axis and including first and second end walls disposed at opposite longitudinal ends of said chamber;

first and second electrodes each comprising a post projecting through a respective one of said end walls and terminating in a convexly curved surface, said posts extending coaxially and being of opposite polarity;

an electrically conductive armature disposed within said chamber and comprising a body defining a second longitudinal axis, said body being symmetrical about said second axis, each longitudinal end of said body including a recess into which a respective one of said first and second electrodes extends, each recess including a cylindrical side wall and an end wall, said armature being movable in a direction parallel to said first axis to enable said convexly curved surfaces to engage said end walls of said recesses, and being movable in a direction laterally of said first axis to enable said convexly curved surfaces to engage said side walls of said recesses.

10. A jitter switch according to claim 9, wherein said chamber is sealed air tight.

11. A jitter switch according to claim 9, wherein said chamber is filled with dampening fluid.

12. A non-magnetic jitter switch, comprising:

a casing forming an inner chamber defining a first longitudinal axis and including first and second end walls disposed at opposite longitudinal ends of said chamber;

first and second electrodes, each extending through a respective one of said end walls and terminating in a recess, said recesses being coaxial with one another and each recess including a cylindrical side wall and being inwardly closed by an end wall;

an electrically conductive armature disposed within said chamber and comprising a post defining a second longitudinal axis, opposite longitudinal ends of said post disposed in respective ones of said recesses and each post terminating in a convexly curved surface, said armature being movable in a direction parallel to said first axis to enable said convexly curved surfaces to engage respective ones of said end walls of said recesses, and being movable in a direction laterally of said first axis to enable said convexly curved surfaces to engage said side walls of respective ones of said recesses, said electrodes and armature being non-magnetized.

13. A jitter switch according to claim 12, wherein said chamber is sealed air tight.

14. A jitter switch according to claim 12, wherein said chamber is filled with dampening fluid.

15. A jitter switch comprising:

a casing forming a circular cylindrical internal chamber defining longitudinal and transverse directions, said longitudinal direction coinciding with a longitudinal axis of said chamber, and said transverse direction coinciding with a diameter of said chamber;

an electrically conductive generally cylindrical armature disposed in said chamber; and positive and negative electrical terminal means communicating with said chamber;

said armature, together with said positive and negative electrical terminal means defining first and second contact regions in said chamber, each of said contact regions comprising:

longitudinally opposite conductors defined by said armature and a respective one of said positive and negative terminals; and transversely opposite conductors defined by said armature and a respective one of said positive and negative terminals;

said armature being movable in said longitudinal direction for producing engagement between said longitudinally opposite conductors of either of said first and second contact regions;

said transversely opposite conductors of each contact region remaining in transversely opposite relationship in all longitudinal positions of said armature, and said armature being movable in said transverse direction for producing engagement between said transversely opposite conductors of either or both of said contact regions;

one of said contact regions comprising a circular cylindrical recess formed in one of said armature and respective terminal means, with the other of said armature and respective terminal means projecting into said recess, and the other contact region comprising a wall of said chamber and protuberance carried by said armature;

an end of said armature disposed opposite said recess being generally conical;

said protuberance extending circumferentially around an outer periphery of said armature at a location between said recess and said frusto-conical end of said armature.

* * * * *